(12) United States Patent
Taguchi

(10) Patent No.: US 7,398,130 B2
(45) Date of Patent: Jul. 8, 2008

(54) ORDERING/ORDER RECEIVING SYSTEM

(75) Inventor: Kentaro Taguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 2 days.

(21) Appl. No.: 11/363,037

(22) Filed: Feb. 28, 2006

(65) Prior Publication Data

US 2006/0212151 A1  Sep. 21, 2006

(30) Foreign Application Priority Data

Mar. 8, 2005  (JP) .............................. 2005-063707

(51) Int. Cl.
G06F 19/00 (2006.01)
(52) U.S. Cl. ...................................... 700/107; 700/106
(58) Field of Classification Search ................. 700/106, 700/107; 705/29
See application file for complete search history.

(56) References Cited

U.S. PATENT DOCUMENTS

| | | | | |
|---|---|---|---|---|
| 5,796,614 A | * | 8/1998 | Yamada | 700/106 |
| 5,943,484 A | * | 8/1999 | Milne et al. | 700/100 |
| 5,971,585 A | * | 10/1999 | Dangat et al. | 700/102 |
| 6,701,201 B2 | * | 3/2004 | Hegde et al. | 700/107 |
| 2001/0014836 A1 | * | 8/2001 | Tamaki et al. | 700/99 |
| 2003/0101110 A1 | * | 5/2003 | Chen et al. | 705/29 |
| 2003/0204455 A1 | * | 10/2003 | Eck et al. | 705/29 |

FOREIGN PATENT DOCUMENTS

JP   2000-079542   3/2000

OTHER PUBLICATIONS

T. Vollmann, et al "Manufacturing Planning and Control Systems", 1988 2nd Edition, pp. 1-27.

* cited by examiner

*Primary Examiner*—Alexander J Kosowski
(74) *Attorney, Agent, or Firm*—Mattingly, Stanger, Malur & Brundidge, P.C.

(57) ABSTRACT

An MRP explosion portion calculates the amount of common and optional parts necessary for producing a forecasted sales amount of products. An amount correlated with actual results of received product orders is added to the amount of optional parts. The delivery amounts are added to stock amount parts data corresponding to the shared and optional parts. If a required amount of products is accepted, an MRP implosion portion assigns shared and optional parts to the required amount of products, and subtracts the amount of the assigned common and optional parts from the stock amount parts data. Then, with respect to each kind of product, an excess amount of common parts is assigned. The amount of products of the kinds to which the excess amount of common parts has been assigned are output as the amount of products of the kinds for which additional orders can be received.

2 Claims, 10 Drawing Sheets

| PARENT ITEM NAME | CHILD ITEM NAME | AMOUNT |
|---|---|---|
| HDD-A | X | 1 |
| HDD-A | Y | 1 |
| HDD-A | Z | 1 |
| HDD-B | X | 1 |
| HDD-B | Y | 1 |
| HDD-B | M | 1 |

FIG. 3

| MODEL NAME | CATEGORY NAME | TYPE NAME |
|---|---|---|
| R450 | BODY UNIT 31a | BODY-A 32A |
| R450 | BODY UNIT 31b | BODY-B 32B |
| R450 | HDD UNIT 31c | HDD-A |
| R450 | HDD UNIT 31d | HDD-B |

33 — 31 — 32

30 (each row)

FIG. 5

| PARTS NAME (51) | DATE (52) | AMOUNT (53) | |
|---|---|---|---|
| X | 05/02 | 20 | } 50 |
| Y | 05/02 | 20 | } 50 |
| Z | 05/02 | 12 | } 50 |
| M | 05/02 | 12 | } 50 |

FIG. 6

| MODEL (63) | DELIVERY DATE (61) | AMOUNT OF PRODUCTS FOR WHICH ADDITIONAL ORDERS CAN BE RECEIVED (62) | AMOUNT OF MANUFACTURABLE PRODUCTS (64) | |
|---|---|---|---|---|
| R450 | 05/02 | 45 | 110 | } 60 |
| D600 | 05/02 | 45 | 135 | } 60 |

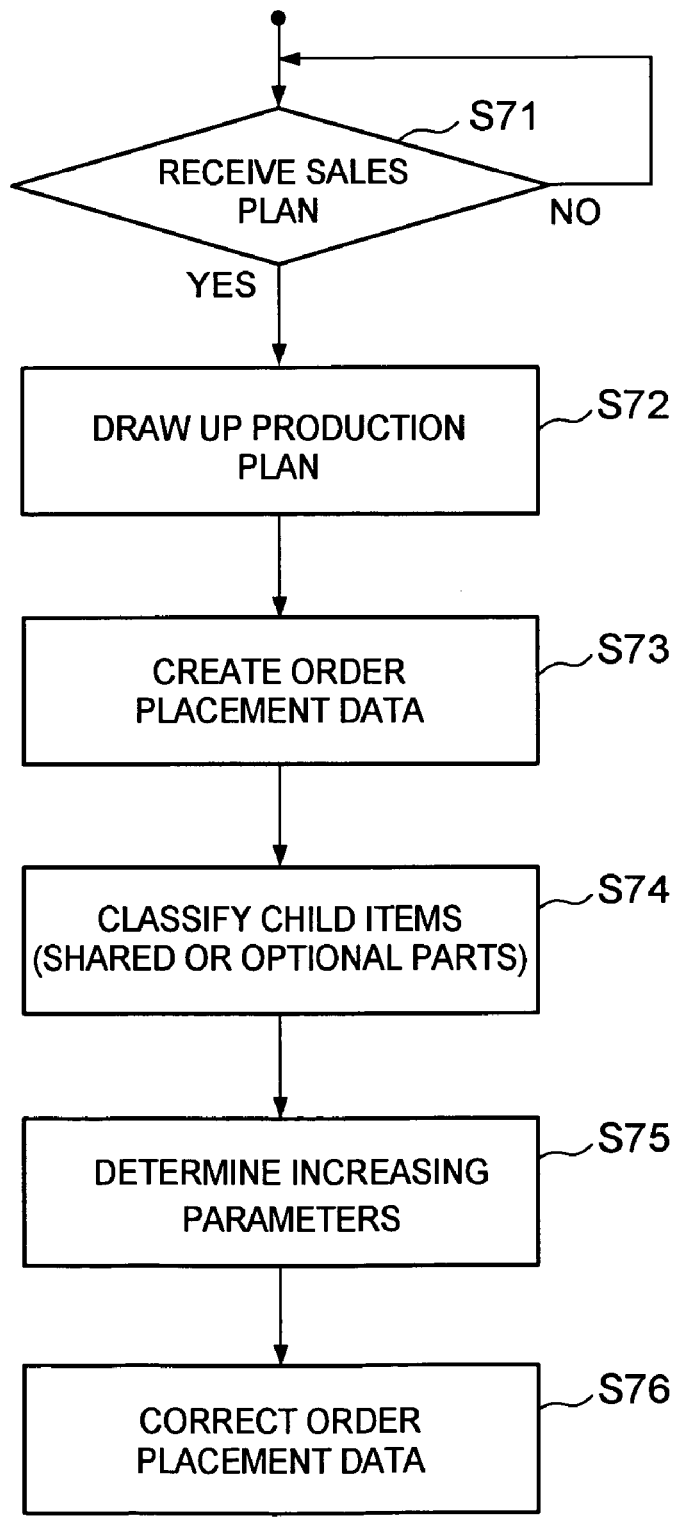

FIG. 11
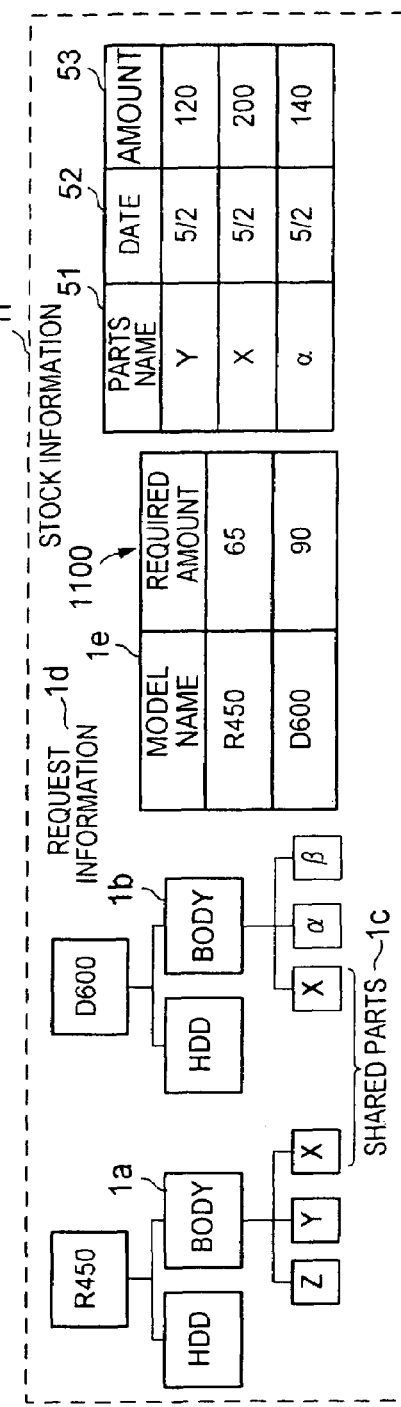
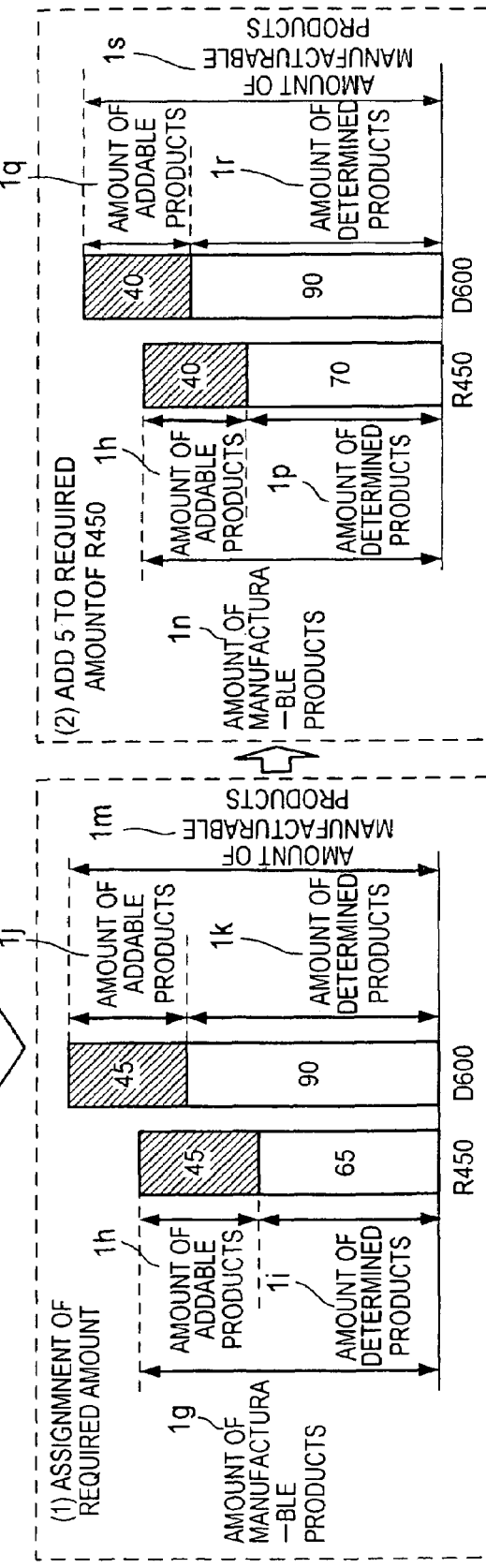

FIG. 12

| MODEL<br>M | DELIVERY DATE<br>D | AMOUNT OF PRODUCTS FOR WHICH ADDITIONAL ORDERS CAN BE RECEIVED<br>N1 | AMOUNT OF MANUFACTURABLE PRODUCTS<br>N2 |
|---|---|---|---|
| R450 | 05/02 | 45 (amount) n1 | 110 (amount) n2 |
| D600 | 05/02 | 45 (amount) n3 | 135 (amount) n4 |

OK

ORDERING/ORDER RECEIVING SYSTEM

BACKGROUND OF THE INVENTION

The present invention relates to an ordering/order receiving system capable of increasing the order amount of products while reducing the amount of parts in stock.

As an example, a production management system described in Japanese Patent Laid-Open Publication No. 2000-79542 is known as a system for drawing up a production plan by making use of material requirement planning (MRP). In this production management system, conditional MRP processing is executed in response to the amount of products required from the seller. If the parts go out of stock as a result, the amount of manufacturable products is calculated from a maximum amount of parts available now according to the priority orders for products (reverse MRP processing) Then, if the amount of manufacturable products is established on the seller side by comparison of the required amount of products and the amount of manufacturable products, the production management system finally exeduted MRP processing in response to the amount of manufactured products. It is said that according to this production management system, the amount of manufactured products on which the seller and manufacturer have agreed can be secured.

According to the above-described conventional production management system, an accurate production amount can be obtained but this system does not lead to an increase of the order amount of products exceeding the production amount.

SUMMARY OF THE INVENTION

Accordingly, it is an object of the invention to increase the amount of products for which orders can be received while suppressing the amount of parts in stock.

According to one aspect of the invention, there is provided an ordering/order receiving system which manages reception of orders for plural kinds of products and placement of orders for parts used for production of the products. The system has:

storage means in which Bill of Materials data indicating configuration of parts of each of the products and stock amount data about parts used for producing the products are stored;

classification means which classifies the parts used for production of the plural kinds of products into common parts used for production of two or more kinds of products out of the plural kinds of products and optional parts other than the common parts, based on the Bill of Materials data;

MRP explosion means which calculates the amount of the common parts and the amount of the optional parts necessary for production of the kinds of products to achieve a forecasted sales of products of the plural kinds as order placement data, based on the forecasted sales of the products and on the Bill of Materials data;

amount of ordered parts- increasing means which adds a amount correlated with actual results of reception of orders for the plural kinds of products to the amount of the optional parts contained in the order placement data;

material management means which adds the amounts of delivery to stock amount data about parts corresponding to the common parts and the optional parts when response information including the delivered amounts of the common parts and the optional parts is accepted in response to the order placement data;

MRP implosion means which, when required amount of the plural kinds of products are accepted, assigns the common parts and the optional parts to the required amount of products based on the Bill of Materials data, subtracts the assigned amount of the common parts and optional parts from the stock amount data about the common parts and optional parts, and then assigns excess amounts of common parts indicated by the stock amount data about the common parts and optional parts corresponding in amount with the excess amount of common parts for each of the plural kinds of products;

and means which outputs the amount of the kinds of products for which the MRP implosion means has assigned the excess amount of common parts as the amount of the products of the kinds for which additional orders can be received.

The invention also provides an ordering/order receiving system which manages reception of orders for plural kinds of products and placement of orders for parts used for producing the products. The system has:

storage means in which Bill of Materials data indicating configuration of parts of each of the products and stock amount data about parts used for production of the products are stored;

classification means which classifies the parts used for production of the plural kinds of products into common parts used for production of two or more kinds of products out of the plural kinds of products and optional parts other than the common parts, based on the Bill of Materials data;

MRP explosion means which calculates the amount of the common parts and the amount of the optional parts necessary for production of the kinds of products to achieve a forecasted sales of the products of the plural kinds as order placement data, based on the forecasted sales of the products and on the Bill of Materials data;

amount of ordered parts-increase means which adds a amount correlated with forecasted reception of orders for the plural kinds of products to the amount of the optional parts contained in the order placement data; material management means which, when response information including amounts of the common parts and the optional parts delivered is accepted in response to the order placement data, adds the amounts of delivery to stock amount data about parts corresponding to the common parts and the optional parts;

MRP implosion means which, when required amount of plural kinds of products are accepted, assigns the common parts and the optional parts to the required amounts of products based on the Bill of Materials data, subtracts the assigned amounts of the common parts and optional parts from the stock amount data about the shaped parts and optional parts, and then assigns excess amounts of common parts indicated by the stock amount data about the common parts and optional parts corresponding in amount to the excess amounts of common parts for each of the plural kinds of products; and means which outputs the amounts of the kinds of products for which the MRP implosion means has assigned the excess amounts of common parts as the amounts of products of the kinds for which additional orders can be received.

BRIEF DESCRIPTION OF THE DRAWINGS

FIG. 3 is a table conceptually illustrating the data structure of a category master table.

FIG. 5 is a table conceptually illustrating the data structure of a stock information table.

FIG. 6 is a table conceptually illustrating the data structure of a delivery due date table.

FIG. 7 is a flowchart of processing of order placement management according to one embodiment of the invention.

FIG. 11 is a diagram illustrating processing for calculating the amount of products for which additional orders can be received and the amount of manufacturable products.

FIG. 12 is a diagram showing the layout of a viewing screen displaying the amount of products for which additional orders can be received and the amount of manufacturable products for each type of product.

DETAILED DESCRIPTION OF THE PREFERRED EMBODIMENTS

Embodiments according to the invention will be hereinafter described with reference to the accompanying drawings.

Prior to description on an ordering/order receiving system according to the present embodiment, products to be managed by the system are described.

Figure 4:
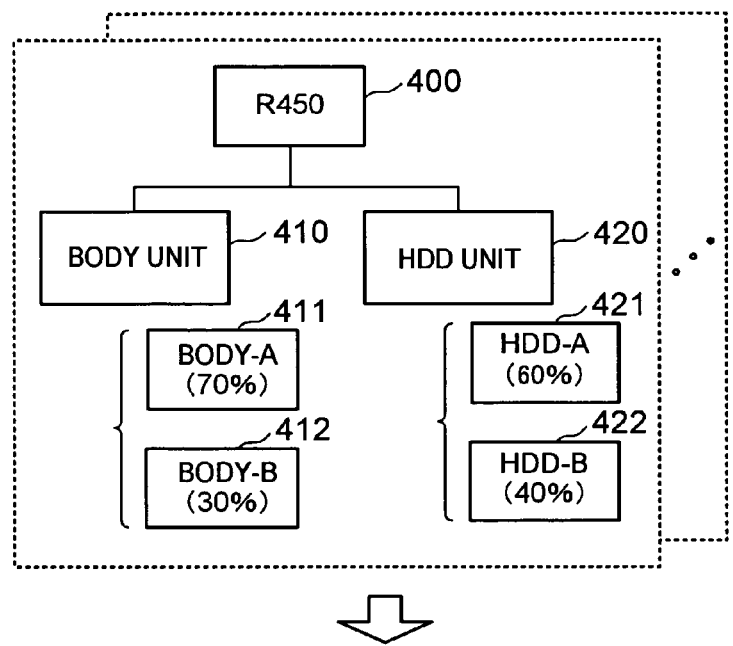
FIGS. 4A and 4B are tables illustrating the data structure of a type name explosion ratio table.

Normally, each finished product is composed of half assemblies of plural categories. For example, as shown in FIG. 4, assemblies constituting a product model "R450" 400 are classified into two kinds of categories: "body unit" 410 and "HDD unit" 420.

The assemblies used for each category of the product model are not limited to one type. Rather, plural types that can be interchangeably used are designed. For example, with respect to the product model "R450" 400, a assembly "body-B" 412 can be used as well as a assembly "body-A 411" as a assembly for the category "body unit". Similarly, a assembly "HDD-B" 422 can be used as a assembly for the category "HDD unit" in addition to a assembly "HDD-A" 421. In this way, use of plural interchangeable types is normally intended for assemblies of each category of the product model.

In the description of the following example, one assembly of each category is used for each product. Plural assemblies of any category may be used for one product.

Figure 1:
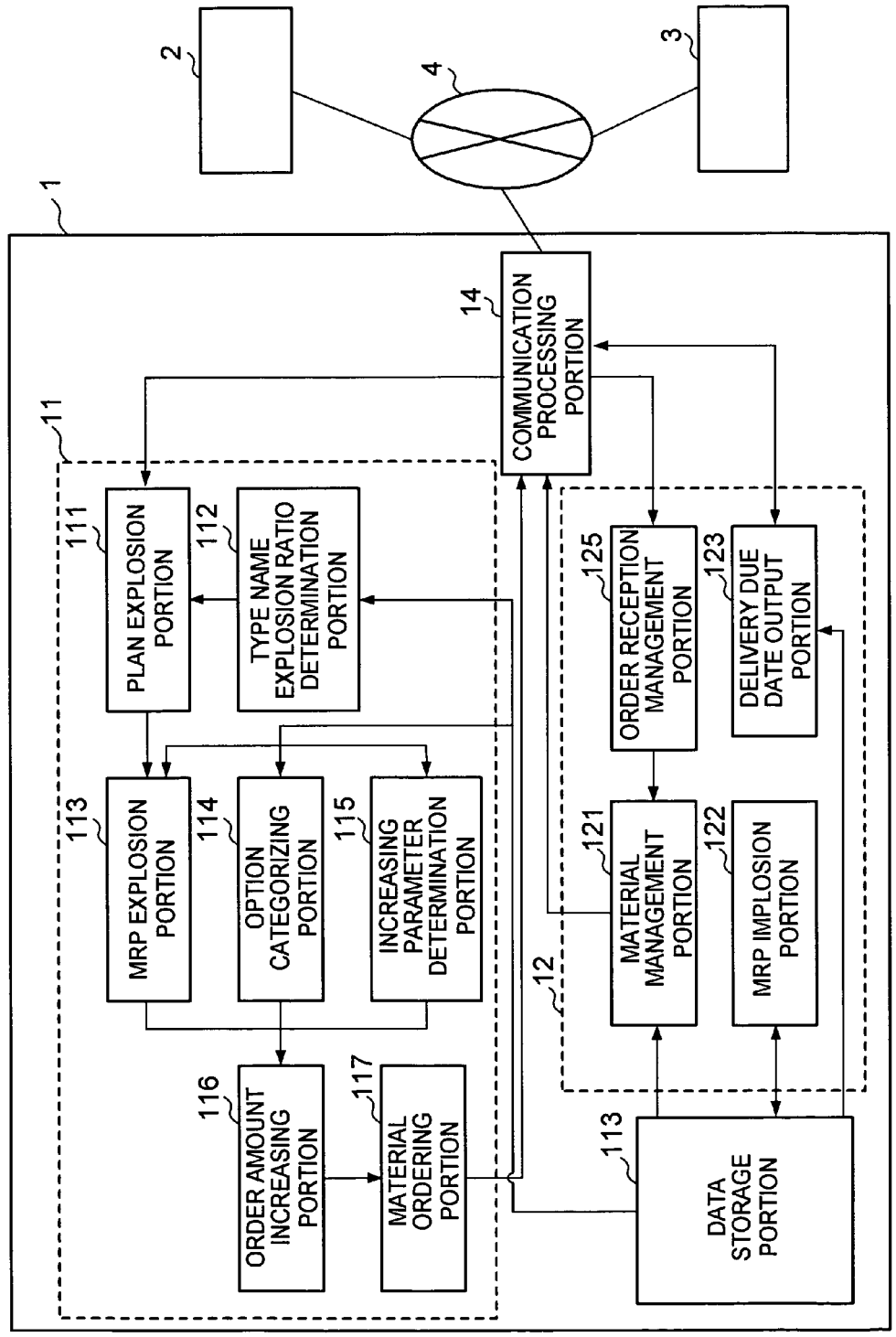
FIG. 1 is a diagram illustrating the whole configuration of an ordering/order receiving system associated with one embodiment of the invention.

The whole configuration of the ordering/order receiving system according to the invention will be next described by referring to figures including FIG. 1. In one example given here, the ordering/order receiving system 1 according to the present embodiment is connected with a system 2 on the seller side and with a system 3 on the parts supplier side via a network 4 such as the Internet.

As shown in FIG. 1, the ordering/order receiving system 1 according to the present embodiment has at least one information processing unit connected with the network 4. The information processing unit has a hardware configuration acting as a normal computer capable of executing programs according to a request from the outside. That is, the information processing unit has a hard disk drive installed with information (programs and data) for realizing required functions, memory, a CPU for executing the program loaded into the memory from the hard disk, and various input/output interfaces.

The information processing unit realizes an order placement management portion 11 for managing placement of orders for parts at the parts supplier system 3, an order reception management portion 12 for managing reception of orders for products from the seller system 2, a data storage portion 13 stored with various kinds of data to be referenced by the management portions 11 and 12, and a communication processing portion 14 for controlling communications via the network 4, by executing the programs. Of these functional configurations, the order placement management portion 11, order reception management portion 12, and data storage portion 13 further have the following configurations.

The order placement management portion 11 has a plan explosion portion 111 for drawing up information about production planning for each product model based on information about a sales plan from the seller system 2 (information about the sales plan drawn up by the seller), a type name explosion ratio determination portion 112 for determining the ratio of use (type name explosion ratio) of each assembly relative to the amount of shipped products during a predetermined period (e.g., 1 day) for each type, an MRP explosion portion 113 for calculating the amount of required assembles for each product model from the information about the production planning, an option categorizing portion 114 for extracting common parts and optional parts from plural product models, an increase parameter determination portion 115 for determining the ratio of increase of the amount of ordered optional products (increase parameters) of products according to past actual results of the received orders in response to a plan of receiving orders for products, an order amount increasing portion 116 for correcting the required amounts of parts of the products of the types based on the increasing ratio, and a material ordering portion 117 for outputting order instructions data including corrected amounts of required parts to the parts supplier system 3. Because of these configurations, the order placement management portion 11 can order a bare minimum amount of optional parts capable of utilizing the stock of the common parts while suppressing the stock of the common parts used among plural product models which are generally expensive in corresponding to varying demand. That is, it is possible to meet the varying demand while suppressing the order placement costs.

The order reception management portion 12 has a material management portion 121 for managing parts scheduled to be in stock based on delivery response information (delivered parts, delivery date, and amount of delivered parts) from the parts supplier system 3, an order reception management portion 125 for accepting order placement information from the seller system 2, an MRP implosion portion 122 for calculating the amount of additional products of each product model for which new orders can be received whenever order placement information is received from the seller system 2, and a delivery due date output portion 123 for sending back the amount of products of each product model for which orders can be received according to the requirement from the seller system. Because of this configuration, the order reception management portion 12 can indicate the amount of manufacturable products of each product model at this instant of time according to the request from the seller.

The following data table referenced by the order reception management portion 12 and order placement management portion 11 is stored in the data storage portion 13.

Figures 2A, 2B:
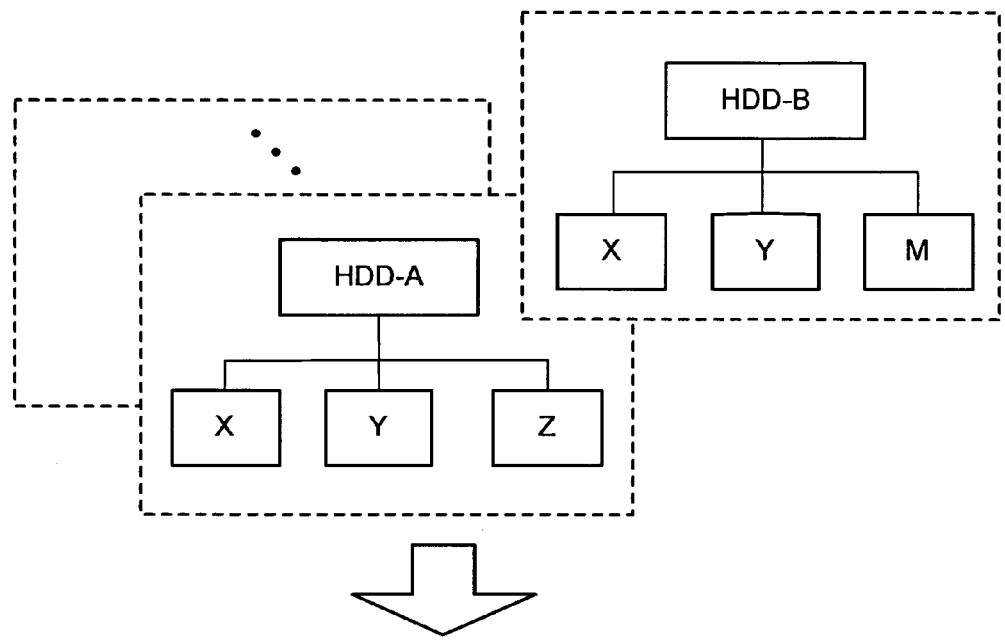
FIGS. 2A and 2B are diagrams illustrating the data structure of a Bill of Materials.

The Bill of Materials (BOM) has previously registered therein parts information including identification information (parent item names) 20 and child item information 21 about child items of the parent items as shown in FIG. 2(B). The identification information 20 includes types of parent items (i.e., products, assemblies, and parts). Identification information (child item names) 21A such as types of child items and a amount 21B used per parent item is registered in each piece of the child item information 21.

For example, according to the Bill of Materials of FIG. 2(B), it can be seen that each parent item "HDD-A" consists of each of 3 different types of child items "X", "Y", and "Z" because of the contents of information about three child items correlated with the identification information "HDD-A", and that each parent item "HDD-B" consists of each of 3 different types of child items "X", "Y", and "M" because of the contents of information about 3 child items correlated with the identification information "HDD-B", as shown in FIG. 2(A). As shown in FIG. 3, category information 30 for each individual assembly used for each product is previously registered in the category master table. Each piece of category information includes identification information (model name) 33 about a product using assemblies, type names 32 of the assemblies, and identification information (category name) 31 about the categories in which the assemblies are used. Stored in a received order actual result information table are a model name, the amount of products for which actual orders have been received, type names of assemblies, and information about correlation with the amount of the used type names for each product model. The information stored in the received order actual result information table is updated, for example, regularly according to the circumstances of reception of orders for each actual product model.

Explosion ratio information 43 is registered in a type name explosion ratio table for each assembly used in the sold products as shown in FIG. 4(B). Each piece of the explosion ratio information 43 includes the type name 42 of each assembly, the model name 40 of the product using the assemblies, the category name 41 of the assemblies, and the ratio of products (type name explosion ratio) 44 using the assemblies to the total amount of product models. The explosion ratio information is, for example, regularly, created by the explosion ratio determination portion 112 based on the information registered in the received order actual result information table, updated, and registered in the type name explosion ratio table.

As shown in FIG. 5, stock information 50 for each part delivered from the parts supplier system 3 is registered in a stock information table. Each piece of stock information includes identification information (parts name) 51 about each part, the amount of stocked parts 53, and date 52.

The newest delivery due date information 60 about each product model is registered in a delivery due date table as shown in FIG. 6. Each piece of delivery due date information includes a product model name 63, a scheduled delivery date 61, the amount of additional products 62 for which additional orders can be received on the scheduled delivery date, and the amount of products 64 capable of being manufactured on the scheduled delivery date.

In this embodiment, the order reception management portion 12 and order placement management portion 11 are realized by one information processor. The invention is not limited to this structure. For example, the functions of the order reception management portion 12 and order placement management portion 11 may be distributed to plural information processors.

Processing of placement and reception of orders executed by the aforementioned ordering/order receiving system will be described separately below by dividing it into processing of management of placement of orders executed by the order placement management portion 11 and processing of management of reception of orders executed by the order reception management portion 12.

(1) Processing of Management of Order Placement

FIG. 7 is a flowchart of processing of order placement management executed by the order placement management portion 11.

Figures 8A, 8B, 8C:
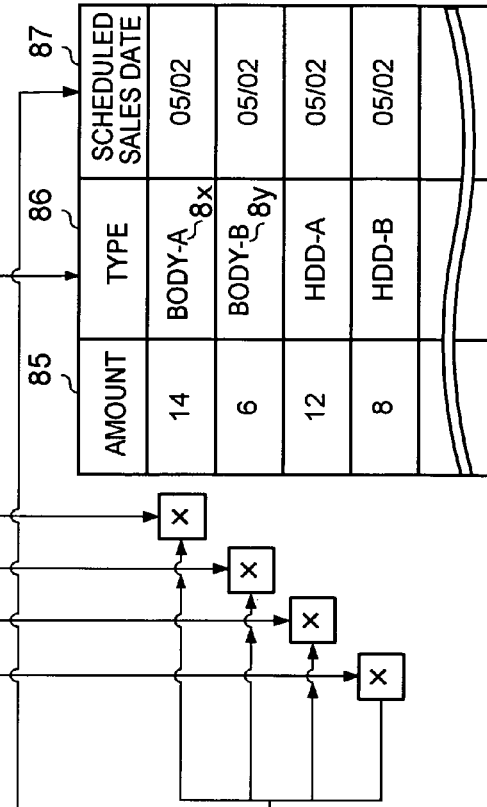
FIGS. 8A, 8B and 8C are tables illustrating preparation of a production plan.

Information about a sales plan created regularly (e.g., every month) based on the results of a demand forecast is entered into the ordering/order receiving system 1 from the seller system. This sales plan information includes a model name 81 for each product model scheduled to be sold by the seller, a scheduled sales start date 82, and a forecasted sales amount 83 as shown in FIG. 8(B).

When an input of the sales plan information is received (S71), the plan explosion portion 111 reads the explosion ratio information 43 including model names coincident with model names 81 contained in the sales plan information from the explosion ratio information table. Furthermore, the plan explosion portion 111 creates production plan information based on the explosion ratio information and sales plan information read out at this time (S72). Specifically, the plan explosion portion 111 first calculates the product of the explosion ratio 44 contained in each piece of the explosion ratio information 43 read out at this time and the forecasted sales amount 83 of the corresponding product model for each piece of the explosion ratio information 43 read out, i.e., the required amount of assemblies of the type indicated by the type name 43 in the explosion ratio information. After calculating the required amount of assemblies of each type in this way, the plan explosion portion 111 creates production plan information for each product model. In this production plan information, the amount of required assemblies 85 for each type is made to correspond to type name 86 and scheduled sales date 87 fetched from the explosion ratio information and sales plan information, respectively, for example, as shown in FIG. 8(C).

Then, the MRP explosion portion 113 finds child items and the amount of them necessary for production of each assembly by a part explosion of the production plan information about each product model according to the parts configurations indicated by the Bill of Materials (BOM). For example, according to the Bill of Materials of FIG. 2(B), each one assembly "HDD-A" uses each one "X", "Y", and "Z". Each assembly "HDD-B" uses each one of "X", "M", and "Y". Therefore, as shown in FIG. 8(C), in a case where the production plan information about the product model "R450" indicates that 12 assemblies "HDD-A" and 8 assemblies "HDD-B" are necessary, parts required for production of the assemblies "HDD-A" and "HDD-B" of the product model "R450" are: 20 parts X, 20 parts Y, 12 parts Z, and 8 parts M.

Figure 9:
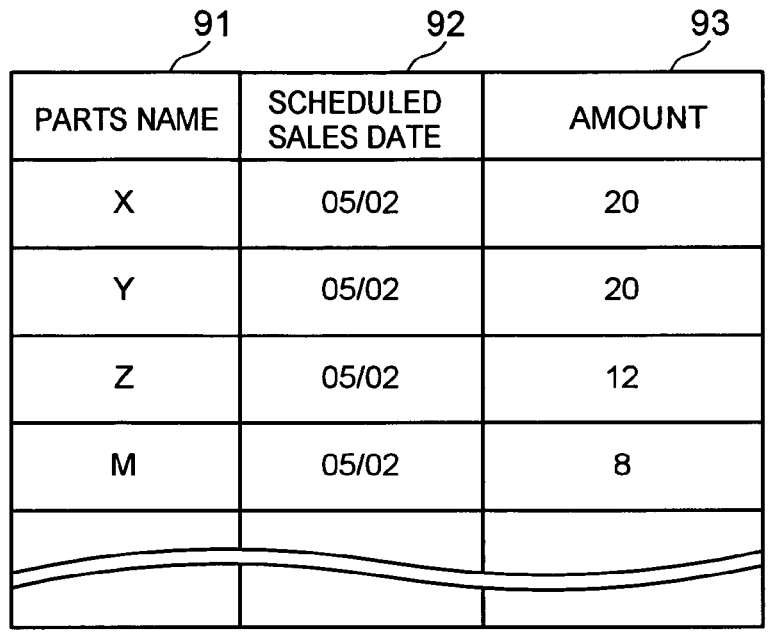
FIG. 9 is a table conceptually illustrating the data structure of order amount data.

The MRP explosion portion 113 creates order amount data in which information found at this time (item name 91 and required amount 93) is made to correspond to a scheduled sales date 92 fetched from the production plan information as shown in FIG. 9 (S75).

Subsequently, the option categorizing portion 114 fetches the category information 30 including the model name 33 coincident with each model name 81 in the sales plan information from the category master table, and fetches parts information including a parent item name 20 coincident with the type name 32 in the category information from the Bill of Materials. In addition, the option categorizing portion 114 classifies parts information including child item names overlapping with other parts information out of the above-described parts information (i.e., child item names made to correspond to two or more parent item names) as parts information about common parts, and classifies other parts information as optional parts information. In this way, child item names used commonly for assemblies of two or more types are categorized as common parts, and child item names used only for assemblies of one type are categorized as optional parts (S74).

Then, the increase parameter determination portion 115 calculates the ratio of the amount of actually used products to the planned amount of products ((the amount of products for which orders have been actually received and which is in the received order actual result information table)/(the total amount of required products 85 of all the types belonging to the category, the types being stored in the production plan information): hereinafter referred to as the hit rate)) and their variance for each category indicated by the category information fetched from the category master table, and computes the hit rate (the amount of used products of each type in the received order actual result information table/the amount of required products of each type in the production plan information) and the variance for each type within each category. In this example, one assembly of the category "body unit" and one assembly of the category "HDD unit" are used for each product. Therefore, the amount of products for which actual orders have been received (the amount of products for which orders have been actually received and which is in the received order actual result information table) is used as the amount of actually used amount of products of the category. Where plural assemblies of one kind of category are used in one product (e.g., 2 units of HDD-A for one product), the amount of products for which actual orders have been received and the amount of assemblies of that category per product may be used as the amount of actually used products of the category.

Furthermore, the increase parameter determination portion 115 determines the increase parameters according to the target value of a predetermined decreasing loss of sales opportunities using the found value of each parameter (75). For example, where the hit rate and variance (1σ) of the category "HDD unit" are 80% and 10%, respectively, the hit rate and variance (1σ) of the type "HDD-A" within the category "HDD unit" are 70% and 15%, respectively, and the hit rate and variance (1σ) of the type "HDD-B" within the category "HDD unit" are 60% and 45%, respectively, the increase parameters of the types "HDD-A" and "HDD-B" having a target decreasing loss of sales opportunities of 2σ are determined as follows.

Where decreasing loss of sales opportunities of 2σ is a target, the amount of products of the category "HDD unit" is 80%+10%×2=100%. The amount of required products of the type "HDD-A" is 70%+15%×2=100%. The amount of required products of the type "HDD-B" is 60%+45%×2=150%. Consequently, the increase parameters of the types "HDD-A" and "HDD-B" are determined as 0% and +50%, respectively, using the following equation.

$$P=(\text{required amount of categories})*(\text{required amount of types})-100\%$$

Note that this method of determining the increase parameters is only one example. The increase parameters may be determined by other methods. For example, they may be determined based either on a forecasted sales amount of products or on the amount of products for which orders were received in practice (actual results of received orders). Furthermore, an artificial procedure may be added to the process of determination of the additional parameters. For example, the administrator appropriately modifies the additional parameters according to the circumstances of reception of orders.

When the increase parameters of each category are determined in this way, the order amount increasing portion 116 corrects only the amount of the optional parts extracted by the option categorizing portion 114 out of the ordered amount data found by the MRP explosion portion 113 based on the additional parameters (S76). That is, the amount of parts corresponding to the ratio indicated by the increase parameters (increase parameters for assemblies including optional parts) made to correspond to the parent item names in the parts information about the optional parts is added only to the amount of parts made to correspond to the child item names in the parts information about the optional parts out of the amount 93 contained in the ordered amount data. For example, where the amount of optional parts "Z" is 12 and an increase parameter of the assemblies "HDD-B" including the optional parts "Z" is +50%, the amount of the optional parts "Z" in the order placement data is corrected to the original amount of "12" plus "12×50%=6".

Thereafter, the material ordering portion 117 sends the corrected order placement data to the parts supplier system 3. In response to this, the parts supplier prepares expensive common parts which are used commonly among plural assemblies and which comply with the amount in the sales plan information according to such corrected order amount data, and increases the amount of relatively cheap optional parts each used alone in individual assemblies by a amount corresponding to a decreasing loss of sales opportunities due to demand variations to prepare the cheap optional parts by the increased number.

(2) Processing of Order Reception Management

Figure 10:
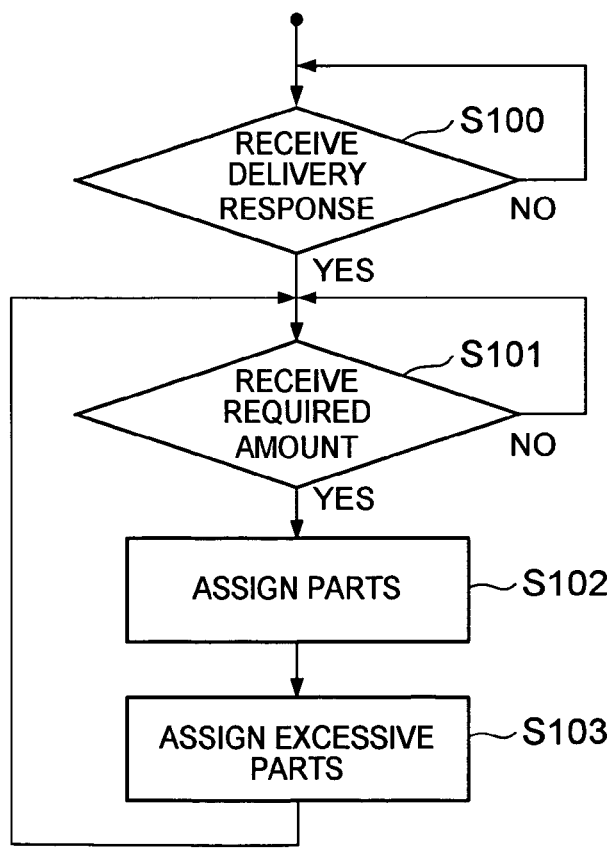
FIG. 10 is a flowchart of processing of order reception management according to one embodiment of the invention.

FIG. 10 is a flowchart of processing of order reception management executed by the order reception management portion 12.

When the parts supplier system 3 sends back delivery response information (delivered parts, delivery date, and the amount of delivered parts) in response to the corrected order placement data (S100), the material management portion 121 updates the stock information table based on the delivery response information. Specifically, the management portion adds the amount of delivered parts in the delivery response information to the amount of stocked parts 53 in the stock information including the parts names 51 coincident with the names of the delivered parts in the delivery response information. The management portion also stores the scheduled delivery date in the item of date 52 of the stock information, the delivery date being in the delivery response information.

Then, whenever information requesting a product model is received from the seller system (S101), the following processing is carried out.

The MRP implosion portion 122 assigns the parts scheduled to be delivered to the parts constituting the required product model by performing processing of MRP implosion (S102).

For example, as shown in FIG. 11, in a case where received request information 1100 indicates that the amount of required products of product model "R450" and the amount of required products of product model "D600" are 65 and 90, respectively, if the two kinds of models have a common part "X" then the MRP implosion portion 122 fetches the amount of common parts "X" used per product for each of the product models "R450" and "D600" from the Bill of Materials, and calculates the product of the fetched amount and the required amount. The product is referred to as the assigned amount of common parts "X". The MRP implosion portion 122 assigns the assigned amount of common parts "X" to the product models "R450" and "D600", respectively, unless the sum of the assigned amount of the common parts "x" found for the product models "R450" and "D600" is in excess of the amount of 53 of the stocked common parts "X" in the stock information table. Furthermore, the MRP implosion portion 122 similarly assigns the amount of used optional parts "Y" and "α" to the product models "R450" and "D600". In this way, the common parts and the optional parts having amount required to fabricate the required amount of product models are determined as finally assigned parts.

Then, the MRP implosion portion 122 subtracts the amount of the finally assigned parts from the amount of stocked parts 53 in the stock information including the parts names. Furthermore, the MRP implosion portion 122 calculates the amount of parts for which orders can be received in an additive manner (the amount of parts for which additional orders can be received) to the present required amount for each product model in the manner described below (S103).

The MRP implosion portion 122 assigns all of those of the common parts "x" which are not used as the finally assigned parts, i.e., surplus common parts "x", to one product model "R450" by processing similar to the aforementioned processing of MRP implosion. In this way, where common parts are assigned to M product models, for example, optional parts "Y" are assigned to the M product models at this time. If the optional parts "Y" can be all assigned to the M product models, the amount M of product models is stored as the amount of products 62 of product model "R450" for which additional orders can be received in the delivery due date table. Further, the sum of the amount of products for which additional orders can be received and the required amount of products of the product model "R450" is stored as the manufacturable amount of products 64 of product model "R450" in the delivery due date table. Additionally, the newest date of the dates contained in the stock information about the common parts "x" and optional parts "Y" is stored as scheduled delivery date 61 in the delivery due date table.

Where the optional parts "Y" go out of stock, the material ordering portion 117 sets the amount of optional parts "Y" that can be assigned to some of the M products of the product model "R450" to which the common parts "x" have been assigned. The amount of the assigned products is taken as the amount of products of the product model "R450" for which additional orders can be received. Order placement data about a deficient amount of optional parts "Y" is sent to the parts supplier system.

The amount of products of other product model "D600" for which additional orders can be received and the amount of manufacturable products are similarly calculated and stored in the delivery due date table.

Since the processing (S101-S103) described so far is performed whenever request information about a product model is received from the seller system, a maximum amount of products for which additional orders can be received depending on adjustment of the currently available common parts and a maximum amount of manufacturable products at the present time are stored in the data storage portion for each product model. For example, as shown in FIG. 11, in the stage where the amount of products of product model "R450" for which additional orders can be received is 45, the amount of manufacturable products of product model "R450" is 110, the amount of products of product model "D600" for which additional orders can be received is 45, and the amount of manufacturable products of product model "D600" is 135, if an order for a amount of (5 in this example) products of the product model "R450" that is less than the amount of (45) products for which additional orders can be received is received, the amount of products for which additional orders can be received and the amount of manufacturable products are recalculated for each of the product models "R450" and "D600" according to the processing described above. The information registered in the delivery due date table is updated. In consequence, the amount of products for which additional orders can be received and the amount of manufacturable products for the product models "R450" and "D600" are updated to 40, 70, 40, and 90, respectively.

Then, if a request for outputting of the amount of additionally received orders is received from the seller system at any timing, a delivery due date managing portion 230 reads the delivery due date information 60 about each product model from the data storage portion according to the request, processes the data into a given format, and sends back the data to the seller system. As a result, a display screen presenting the scheduled delivery date, the amount of products for which additional orders can be received, and the amount of manufacturable products are displayed for each product model on the display screen of the seller system as shown in FIG. 12.

According to the processing described so far, the production planner of the manufacturer fabricating a plurality of product models can present a maximum amount of products, for which additional orders can be received depending on adjustment of the presently available common parts, to the seller. This can prevent loss of the sales opportunities of products. Meanwhile, expensive common parts are not prepared as stocked parts up to the amount with which additional orders can be received for each individual product model. Consequently, the stock amount can be suppressed. As a result, the order placement costs can be reduced.

In the embodiment described so far, parts used commonly among two or more types of products are taken as common parts. The invention is not limited to this method. For example, only parts used commonly among all types of products may be treated as common parts. In this case, parts used commonly among some types of products may be treated as n common parts different from optional parts, for example, by setting increase parameters producing less opportunity loss than the increase parameters for the optional parts.

The sales plan of the seller may be read from a storage medium or entered via a network in a case where connection with the system of the seller is made via the network.

The invention claimed is:

1. An ordering/order receiving system which manages reception of orders for plural kinds of products and placement of orders for parts used for production of the products, the system comprising:

storage means in which Bill of Materials data indicating configuration of parts of each of the products and stock amount data about parts used for production of the products are stored;

classification means which classifies the parts used for production of the plural kinds of products into common parts used for production of two or more kinds of products out of the plural kinds of products and optional parts other than the common parts, based on the Bill of Materials data;

MRP explosion means which calculates, as order placement data, the amount of the common parts and the amount of the optional parts necessary for producing the respective kinds of the products to achieve a forecasted sales, based on a forecasted amount of sales of the plural kinds of the products and on the Bill of Materials data;

amount of ordered parts-increase means which determines increase parameters of the amount of the optional parts contained in the order placement data, based on amount of actually used assemblies of each category used for the plural kinds of products and on the amount of products scheduled to be used, and corrects the amount of the optional parts based on the increase parameters;

material management means which adds amounts of delivery to stock amount data of the parts corresponding to the common parts and the optional parts, when response information including the delivered amounts of the common parts and the optional parts is accepted in response to the order placement data;

MRP implosion means which, when required amount of products of the plural kinds are accepted, assigns the common parts and the optional parts to the required amount of products based on the Bill of Materials data, subtracts the assigned amount of the common parts and optional parts from the stock amount data about the parts corresponding to the common parts and optional parts, and then assigns excess amount of common parts indicated by the stock amount data about the common parts and optional parts corresponding in amount with the excess amount of common parts for each of the plural kinds of products; and means which outputs the amount of the kinds of products to which the MRP implosion means has assigned the excess amount of common parts and the optional parts as amount of the kinds of products for which additional orders can be received, wherein the amount of ordered parts-increasing means determines a ratio of increase of the amount of the optional parts contained in the order placement data, based on amount of actually used assemblies of each category used for the plural kinds of products and on the amount of products scheduled to be used.

2. A method of managing reception of orders for plural kinds of products and placement of orders for parts used for production of the products by an information processing unit, the information processing unit having storage means in which Bill of Materials data indicating parts configuration of each of the products and stock amount data about the parts used for the production of the products are stored and arithmetic processing means, the method comprising the steps of:

classifying the parts used for production of the plural kinds of products into common parts used for production of two or more kinds of products out of the plural kinds of products and optional parts other than the common parts based on the Bill of Materials data in the storage means by means of said arithmetic processing means;

calculating the amount of the common parts and the amount of the optional parts necessary for producing the kinds of products to achieve a forecasted sales of the plural kinds of products as order placement data based on a forecasted sales amount of the products and Bill of Materials data in the storage means by means of said arithmetic processing means;

determining increase parameters of the amount of the optional parts contained in the order placement data, based on amount of actually used assemblies of each category used for the plural kinds of oroducts and on the amount of products scheduled to be used;

correcting the amount of the optional parts based on the increase parameters;

adding an amount of the optional parts delivered and an amount of the common parts delivered to stock amount data about parts corresponding to the common parts and the optional parts by means of said arithmetic processing means if response information including the amounts of the common parts and the optional parts delivered is received in response to the order placement data;

assigning the common parts and the optional parts to required amount of the products based on the Bill of Materials data by means of said arithmetic processing means if required amount of products of the plural kinds are accepted;

subtracting the amount of the assigned common parts and the amount of the assigned optional parts from the stock amount data about the parts corresponding to the common parts and the optional parts by means of the arithmetic processing means;

then assigning excess amount of optional parts indicated by the stock amount data about the common parts and optional parts corresponding in amount to the excess amount of common parts for each of the plural kinds of products by means of the arithmetic processing means; and outputting the amount of products of each kind to which the excess amount of common parts and the optional parts have been assigned as the amount of products of the kinds for which additional orders can be received, wherein the arithmetic processing means determines a ratio of increase of the amount of the optional parts contained in the order placement data, based on amount of actually used assemblies of each category used for the plural kinds of products and on the amount of products scheduled to be used.

* * * * *